US012191574B2

(12) United States Patent
Hwang et al.

(10) Patent No.: US 12,191,574 B2
(45) Date of Patent: Jan. 7, 2025

(54) ANTENNA ARRAY DEVICE

(71) Applicant: DELTA ELECTRONICS, INC., Taoyuan (TW)

(72) Inventors: Chieh-Tsao Hwang, Taoyuan (TW); Yen-Ting Chen, Taoyuan (TW); Siang-Rong Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 58 days.

(21) Appl. No.: 17/450,069

(22) Filed: Oct. 5, 2021

(65) Prior Publication Data

US 2022/0368034 A1 Nov. 17, 2022

(30) Foreign Application Priority Data

May 13, 2021 (CN) ........................ 202110520119.1

(51) Int. Cl.
*H01Q 21/24* (2006.01)
*H01Q 1/48* (2006.01)
*H01Q 1/52* (2006.01)

(52) U.S. Cl.
CPC ............... *H01Q 21/24* (2013.01); *H01Q 1/48* (2013.01); *H01Q 1/523* (2013.01)

(58) Field of Classification Search
CPC ......... H01Q 21/065; H01Q 1/521-523; H01Q 9/40-42; H01Q 9/04; H01Q 15/008; H01Q 21/24; H01Q 19/005
See application file for complete search history.

(56) References Cited

U.S. PATENT DOCUMENTS 10,965,020 B2 * 3/2021 Nakamura ............. H01Q 1/525
2012/0169550 A1 * 7/2012 Schlub ................. H01Q 9/0407 343/893
2012/0190296 A1 * 7/2012 Sarabandi .......... H04B 7/15564 343/893
2013/0099980 A1 * 4/2013 Hayashi ................. H01Q 5/385 343/700 MS (Continued)

FOREIGN PATENT DOCUMENTS

CN 105322291 A 2/2016
CN 111710970 A 9/2020

(Continued)

*Primary Examiner* — Ricardo I Magallanes
(74) *Attorney, Agent, or Firm* — CKC & Partners Co., LLC

(57) ABSTRACT

An antenna array device provided, which includes a substrate, multiple antenna elements, a metal ground plate and a first isolation unit group. The multiple antenna elements are disposed on a first surface of the substrate. The multiple antenna elements have a first polarization direction and a second polarization direction opposite to the first polarization direction. The first isolation unit group is disposed between adjacent two of the multiple antenna elements. An arrangement direction of the first isolation unit group is perpendicular to the first polarization direction and the second polarization direction. The first isolation unit group is two isolation units which are adjacent, each of which comprises an outer end and an inner end opposite to the outer end. The inner end is connected to the metal ground plate disposed on a second surface of the substrate via a second via.

6 Claims, 7 Drawing Sheets

SP

(56) References Cited

U.S. PATENT DOCUMENTS

| | | | | |
|---|---|---|---|---|
| 2016/0111777 | A1* | 4/2016 | Yang | H01Q 9/04 343/841 |
| 2016/0141748 | A1* | 5/2016 | Tagi | H01Q 1/521 342/175 |
| 2016/0190687 | A1* | 6/2016 | Shao | H02J 50/27 343/824 |
| 2018/0006367 | A1* | 1/2018 | Clark | H01Q 21/065 |
| 2018/0277946 | A1* | 9/2018 | Murata | H01Q 1/48 |
| 2019/0319367 | A1* | 10/2019 | Edwards | H01Q 3/2605 |
| 2020/0365536 | A1* | 11/2020 | Kim | H01L 23/3114 |
| 2021/0005955 | A1* | 1/2021 | Sudo | H01Q 1/523 |
| 2021/0005982 | A1* | 1/2021 | Han | H01Q 9/0414 |
| 2021/0028559 | A1* | 1/2021 | Hwang | H01Q 15/0086 |
| 2021/0029821 | A1* | 1/2021 | Hwang | H01Q 15/008 |
| 2021/0083380 | A1* | 3/2021 | Takayama | H01Q 5/28 |
| 2021/0143557 | A1* | 5/2021 | Patotski | H01Q 21/08 |
| 2021/0239788 | A1* | 8/2021 | Arage | G01S 7/032 |
| 2021/0242596 | A1* | 8/2021 | Komura | H01Q 23/00 |
| 2022/0085521 | A1* | 3/2022 | Komura | H01Q 21/065 |
| 2022/0166149 | A1* | 5/2022 | So | H01Q 5/307 |
| 2023/0101577 | A1* | 3/2023 | Yong | H01Q 19/06 343/860 |

FOREIGN PATENT DOCUMENTS

| | | | | |
|---|---|---|---|---|
| CN | 112448172 | B | 4/2021 | |
| KR | 10-2010-0124368 | A | 11/2010 | |
| KR | 2010124368 | A * | 11/2010 | H01Q 1/243 |
| TW | 201019538 | A1 | 5/2010 | |
| TW | I583052 | B | 5/2017 | |
| TW | 202105838 | A | 2/2021 | |

* cited by examiner

ANTENNA ARRAY DEVICE

CROSS-REFERENCE TO RELATED APPLICATION

This application claims priority to China Application Serial Number 202110520119.1, filed May 13, 2021, which is herein incorporated by reference in its entirety.

BACKGROUND

Field of Disclosure

The present disclosure relates to technology of fifth generation new radio (5G NR). More particularly, the present disclosure relates to an antenna array device.

Description of Related Art

In an antenna array of fifth-generation new radio (5G NR) millimeter wave (mmWave), a steering angle is standard of measurement of reachable scanning range of an antenna beam. At present, patch antennas have been widely used in current 5G NR mmWave antenna arrays. However, due to coupling effect between the patch antennas, its scanning angle is often affected. Therefore, how to reduce the coupling effect between the patch antennas to increase the steering angle is a problem that those skilled in the art eager to solve.

SUMMARY

The disclosure provides an antenna array device, which includes a substrate, multiple antenna elements, a metal ground plate and a first isolation unit group. The substrate comprises a first surface and a second surface. The multiple antenna elements are disposed on the first surface, where the multiple antenna elements have a first polarization direction and a second polarization direction opposite to the first polarization direction, and the multiple antenna elements have a first via respectively. The metal ground plate is disposed on the second surface. The first isolation unit group is disposed between adjacent two of the multiple antenna elements, where an arrangement direction of the first isolation unit group is perpendicular to the first polarization direction and the second polarization direction, where the first isolation unit group is two isolation units which are adjacent, each of the two isolation units comprises an outer end and an inner end opposite to the outer end, and the inner end is connected to the metal ground plate via a second via.

Based on the above, the antenna array device provided by the present disclosure increases isolation between the antenna elements by providing the isolation unit between two of the antenna elements, thereby increasing a steering angle of the antenna elements.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
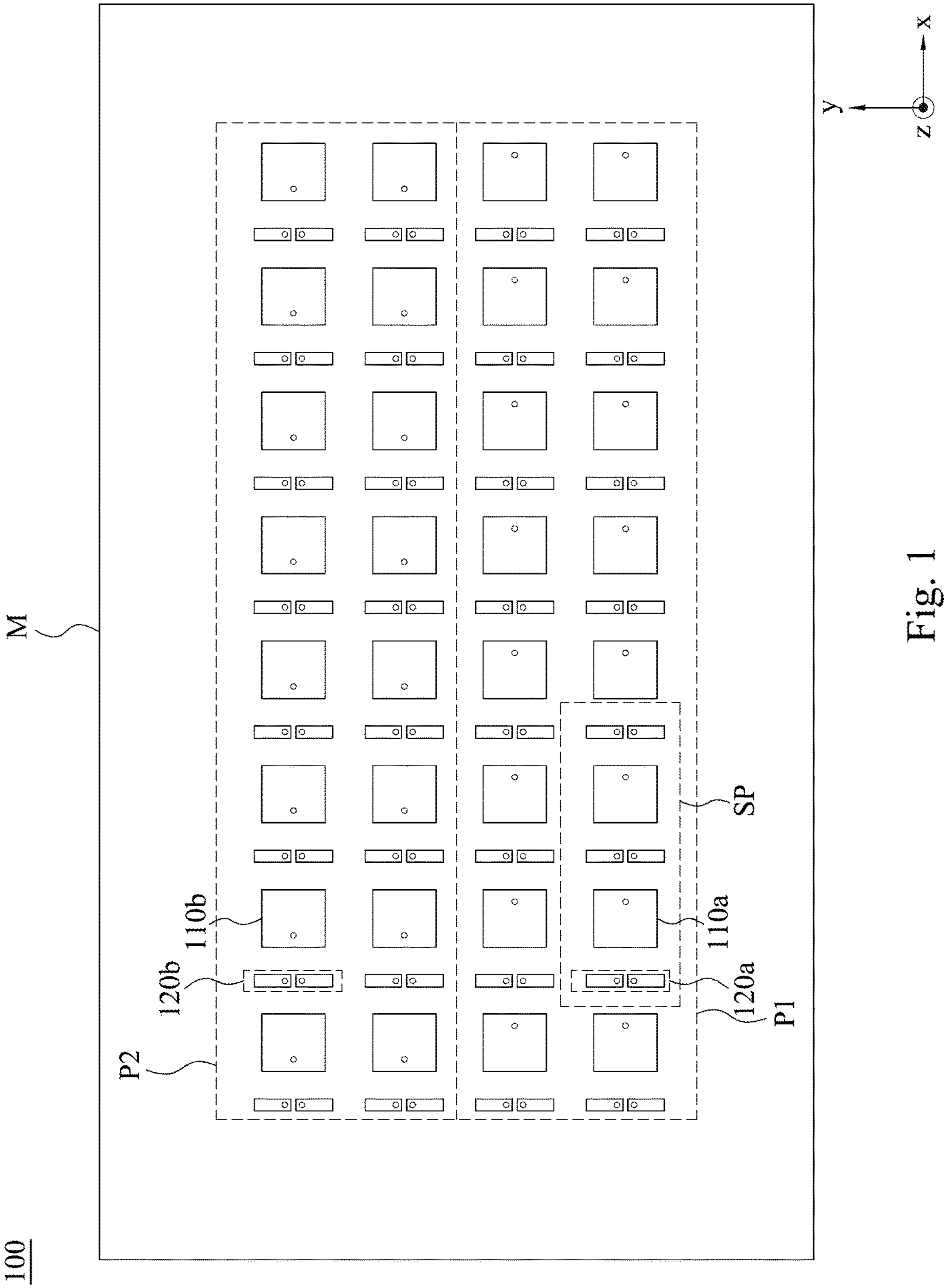
FIG. 1 is a top view of an antenna array device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
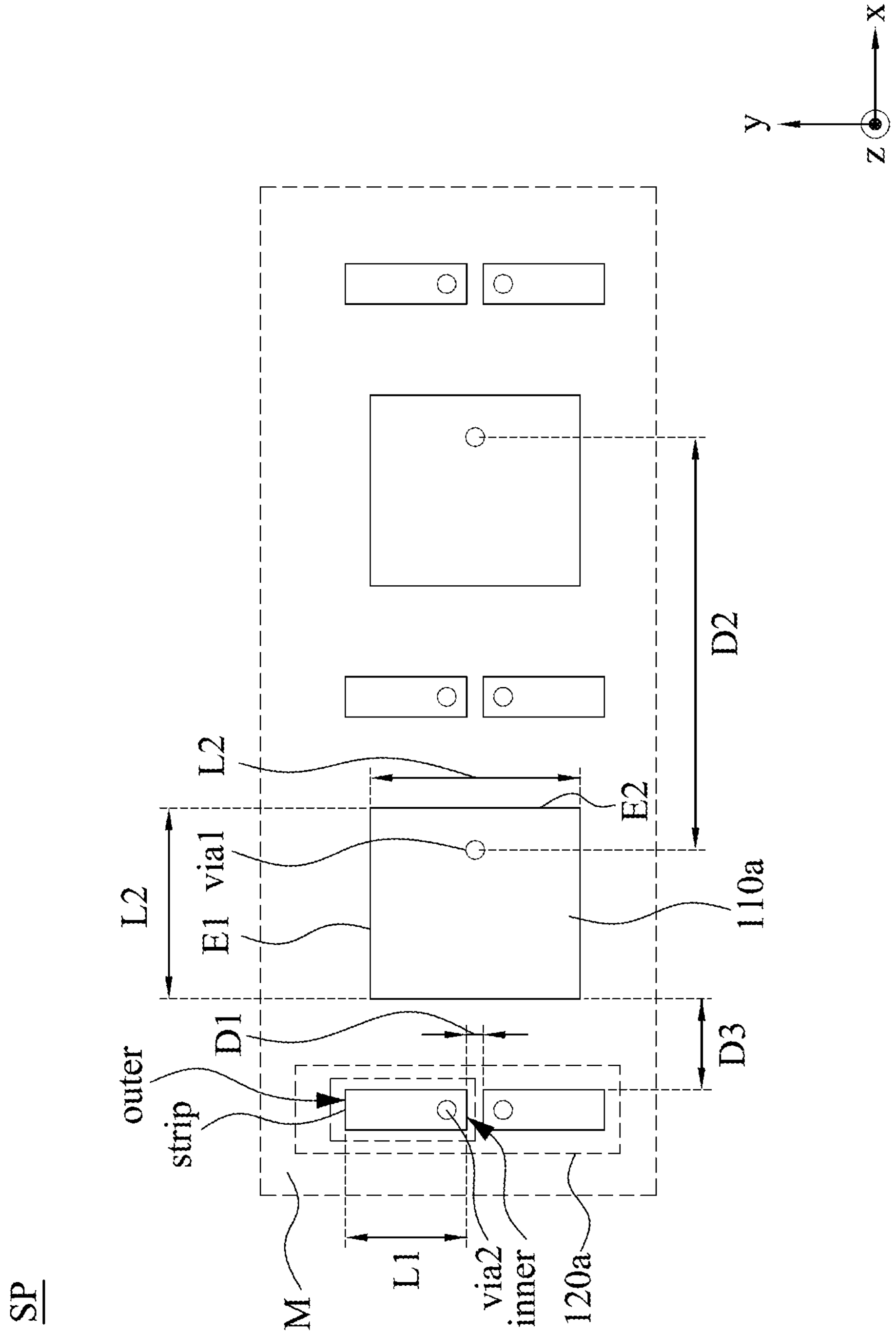
FIG. 2 shows a top view of a part of the antenna array device according to an embodiment of the disclosure.
Figure 3:
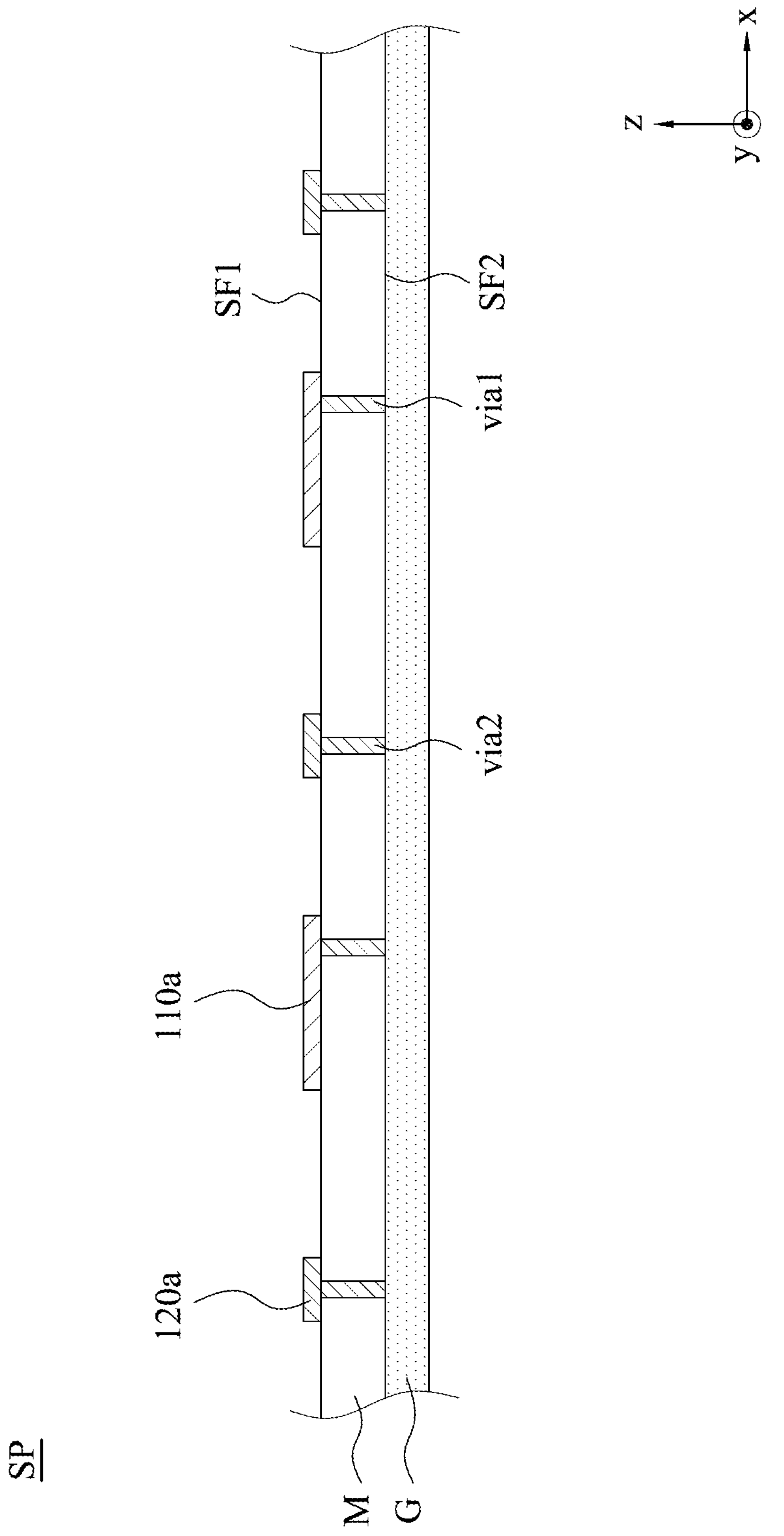
FIG. 3 is a side view of a part of the antenna array device according to an embodiment of the disclosure.

FIG. 1 is a top view of an antenna array device 100 according to an embodiment of the disclosure, where FIG. 1 is a top view on an x-y plane. FIG. 2 shows a top view of a part SP of the antenna array device 100 according to an embodiment of the disclosure, where FIG. 2 is a top view on the x-y plane. FIG. 3 is a side view of the part SP of the antenna array device 100 according to an embodiment of the disclosure, where FIG. 3 is a top view on an x-z plane. Referring to FIGS. 1 to 3 at the same time, an antenna array device 100 includes a substrate M, a first antenna array P1, a second antenna array P2, and a metal ground plate G.

Furthermore, the substrate M includes a first surface SF1 and a second surface SF2 corresponding to each other. The first antenna array P1 includes multiple antenna elements (e.g., an antenna unit 110*a* shown in FIG. 1), where the multiple antenna elements in the first antenna array P1 is disposed on the first surface SF1, and these antenna elements have a first polarization direction (e.g., a −x direction).

In addition, the second antenna array P2 also includes multiple antenna elements (e.g., an antenna element 110*b* shown in FIG. 1), where the multiple antenna elements in the second antenna array P2 also are disposed on the first surface SF1, and these antenna elements have a second polarization direction (e.g., a x direction) opposite to the first polarization direction.

It is worth noting that, although the first antenna array P1 and the second antenna array P2 in FIGS. 1 to 3 have horizontal polarization directions (i.e., a −x direction and a x direction), the first antenna array P1 and the second antenna array P2 also have vertical polarization directions (e.g. when the first antenna array P1 and the second antenna array P2 in FIGS. 1 to 3 are turned 90 degrees counterclockwise, the polarization direction of the first antenna array P1 and a polarization direction of the second antenna array P2 are a −y direction and a y direction respectively).

Furthermore, the metal ground plate G is disposed on the second surface SF2. In some embodiments, the multiple antenna elements in the first antenna array P1 and the multiple antenna elements in the second antenna array P2 can all be connected to the antenna feed points via respective vias (e.g., a first via via1 in a part SP of the antenna array device 100 in FIG. 2).

In addition, the first antenna array P1 further includes multiple isolation unit groups (e.g., an isolation unit group 120*a* in FIG. 1), and the second antenna array P2 also includes multiple isolation unit groups (e.g., an isolation unit group 120*b* in FIG. 1). Further, the isolation unit group is disposed between adjacent two of the antenna elements (i.e., one isolation unit group is disposed between all two adjacent antenna elements), where an arrangement direction of the isolation unit group is perpendicular to the first polarization direction and the second polarization direction. For example, when the first polarization direction and the second polarization direction are the −x direction and the x direction respectively, the arrangement direction of the isolation unit group is the y direction.

In this embodiment, the isolation unit group is two isolation units (e.g., an isolation unit strip in the part SP of the antenna array device 100 in FIG. 2) which are adjacent, where each of the two isolation units includes an outer end (e.g., an outer end outer on the isolation unit strip in the part SP of the antenna array device 100 of FIG. 2) and an inner end opposite to the outer end (e.g., an inner end of the isolation unit strip in the part SP of the antenna array device 100 in FIG. 2), and the inner end is connected to the metal ground plate G via a via (e.g., a second via via2 on the isolation unit strip in the part of the antenna array device 100 in FIG. 2).

In some embodiments, the substrate M can be a printed circuit board (PCB) made of an insulating material, and a material of the substrate M can be Teflon (PTFE) or epoxy resin. (FR4) and other materials commonly used to manufacture PCB. In this way, the first antenna array P1, the second antenna array P2, and the isolation unit group can be directly printed on the substrate M (e.g., multiple patch antennas is printed on the substrate M as the first antenna array P1 and the second antenna array P2, and multiple metal strips is printed on the substrate M as the isolation unit in the isolation unit group). In addition, the metal ground plate G can be made of metal materials such as copper foil.

In some embodiments, length (e.g., length L1 in the part SP of the antenna array device 100 in FIG. 2) of the isolation unit in the isolation unit group can be a quarter wavelength of center frequency of a resonance frequency band of the first antenna array P1 and the second antenna array P2.

In some embodiments, a distance (e.g., a distance D1 in the part SP of the antenna array device 100 in FIG. 2) between the isolation units in the isolation unit group can be less than one-twentieth wavelength of the center frequency of the resonance frequency band of the first antenna array P1 and the second antenna array P2.

In some embodiments, a distance (e.g., a distance D2 in the part SP of the antenna array device 100 in FIG. 2) between the vias of adjacent two of these above-mentioned antenna elements (i.e., all the antenna elements in the first antenna array P1 and the second antenna array P2) is a half wavelength of the center frequency of the resonance frequency band of the first antenna array P1 and the second antenna array P2.

In some embodiments, the antenna elements in the first antenna array P1 and the second antenna array P2 can both include two edges (e.g., edges E1 and E2 in the part SP of the antenna array device 100 in FIG. 2), where length of the two edges (e.g., length L2 in the part SP of the antenna array device 100 in FIG. 2) can be equal. In a further embodiment, a distance (e.g., a distance D3 in the part SP of the antenna array device 100 in FIG. 2) between the antenna element and the isolation unit group which is adjacent to the antenna element can be one-third the length of the aforementioned edge.

In some embodiments, the isolation unit group can resonate with the above-mentioned antenna elements by the respective vias to isolate signals between the antenna elements. In other words, a part of the signals generated by the antenna elements can interfere with adjacent antenna elements by positions of the vias of the isolation unit group. Therefore, these vias can be used to resonate with the antenna elements to prevent the part of the signals generated by the antenna elements from interfering with the adjacent antenna elements. In this way, isolation between these antenna elements can be greatly increased, so as to increase a steering angle of each antenna element.

Based on the above, the above-mentioned antenna array device 100 uses the isolation unit group between two adjacent antenna elements to increase the isolation between the antenna elements, thereby greatly increasing a steering range of each antenna unit.

It is worth noting that, in addition to one isolation unit group disposed between the two adjacent antenna elements, second isolation unit group can be disposed between the two adjacent antenna elements. Therefore, an embodiment in which the two isolation unit groups are disposed between the two adjacent antenna elements is proposed below.

Figure 4:
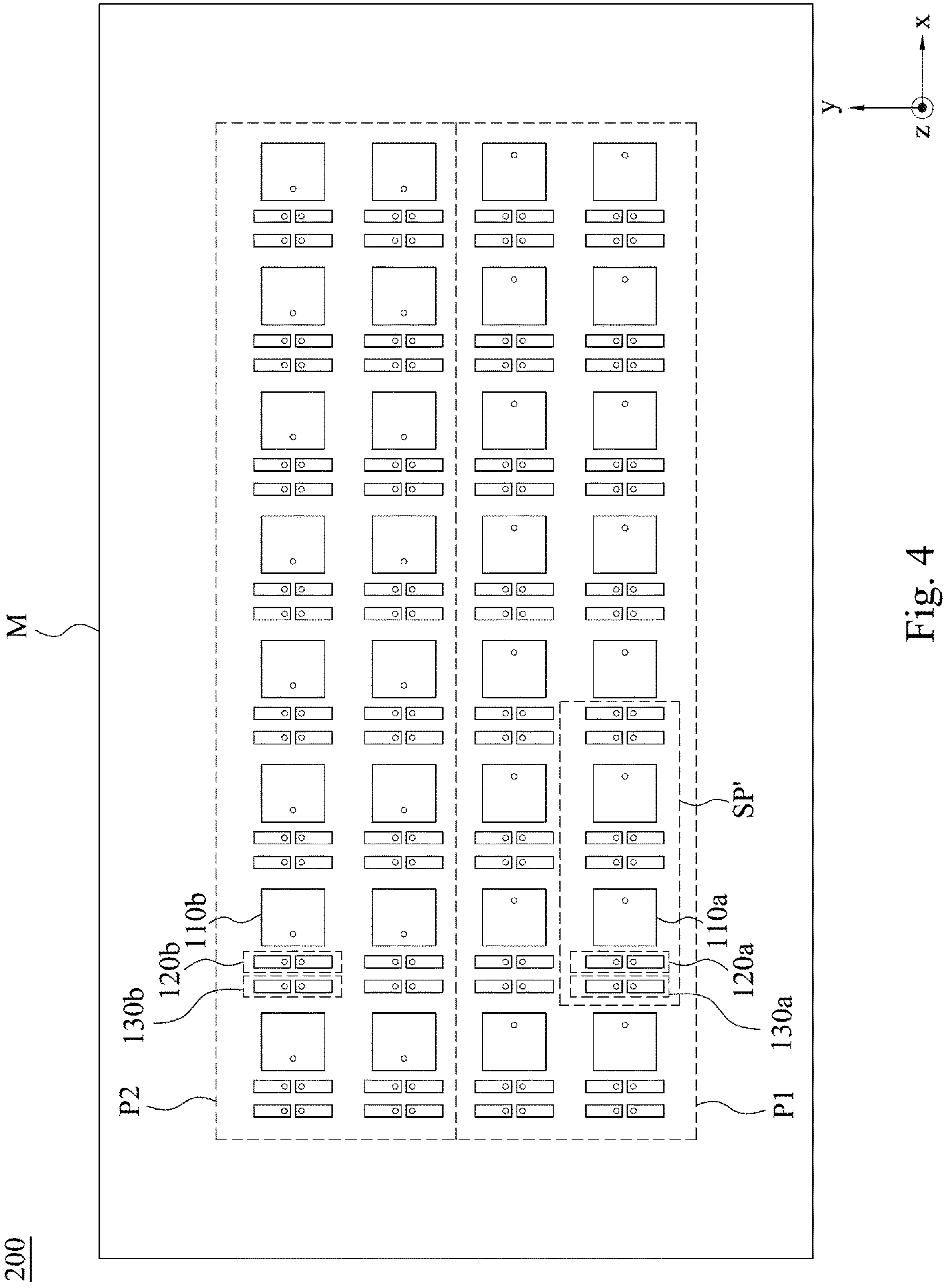
FIG. 4 is a top view of the antenna array device according to another embodiment of the disclosure.
Figure 5:
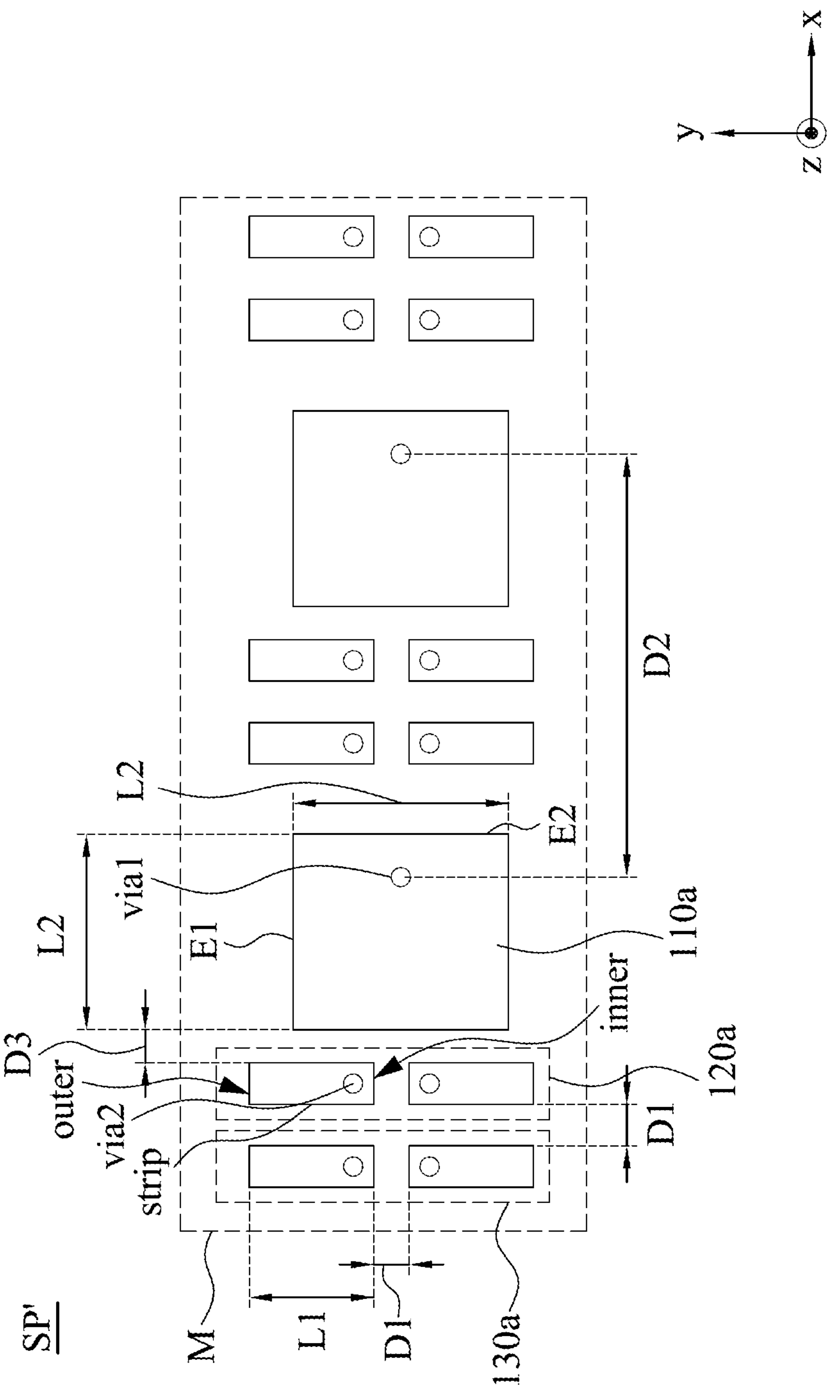
FIG. 5 is a top view of a part of the antenna array device according to another embodiment of the disclosure.
Figure 6:
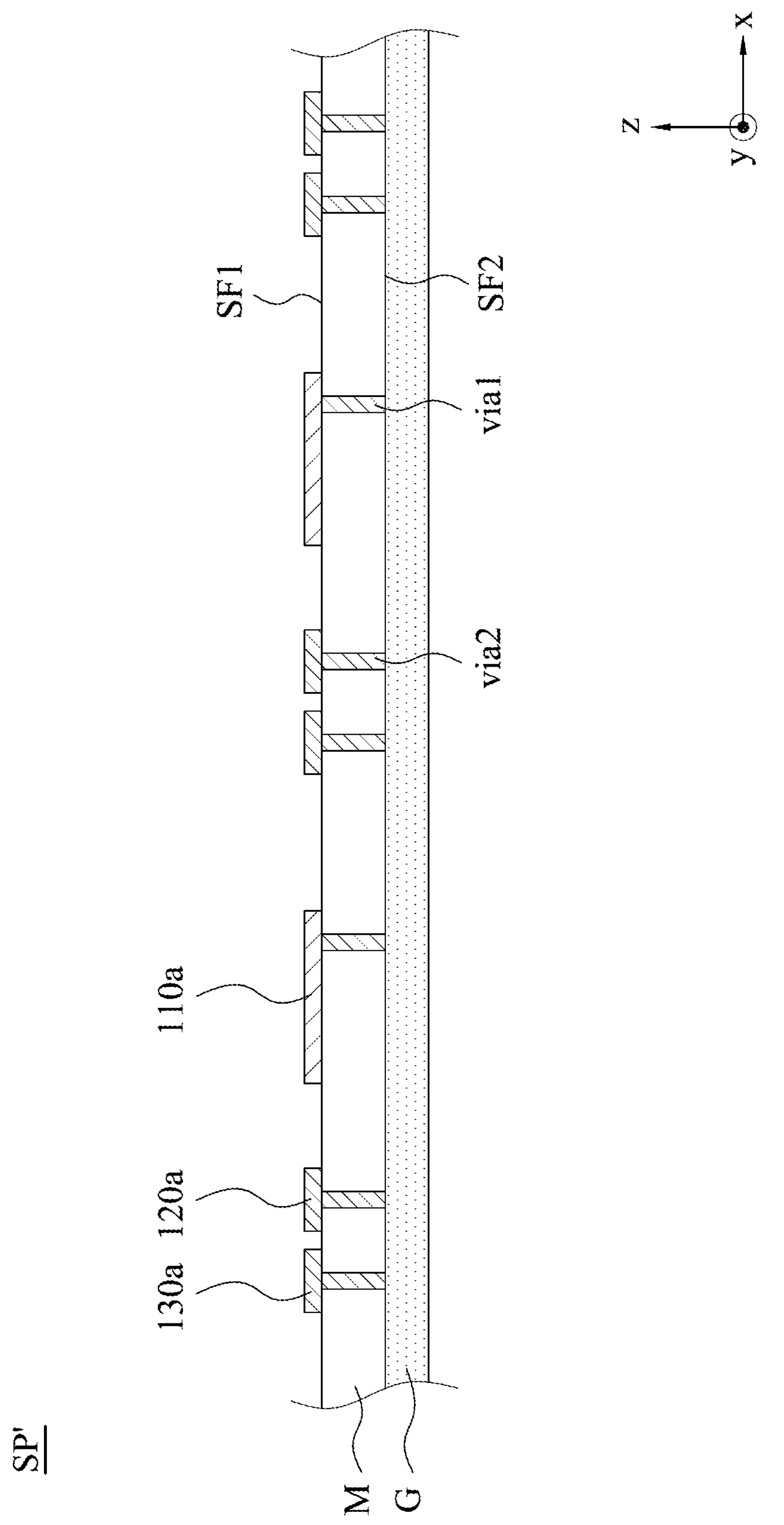
FIG. 6 is a side view of the part of the antenna array device according to another embodiment of the disclosure.

FIG. 4 is a top view of the antenna array device 200 according to another embodiment of the disclosure, where FIG. 4 is the top view on the x-y plane. FIG. 5 is a top view of a part SP' of the antenna array device 200 according to another embodiment of the disclosure, where FIG. 5 is the top view on the x-y plane. FIG. 6 is a side view of the part SP' of the antenna array device 200 according to another embodiment of the disclosure, where FIG. 6 is the side view on the x-z plane. Referring to FIGS. 4 to 6 at the same time, an antenna array device 200 adopts a configuration similar to that of the antenna array device 100 in FIGS. 1 to 3, where differences between the two are only in a number of isolation unit groups provided between two adjacent antenna elements (i.e., the antenna array device 200 adopts arrangement of two isolation unit groups, and the antenna array device 100 adopts arrangement of the one isolation unit group). Therefore, only the differences are described here, and the rest of similarities will not be repeated.

In detail, in a first antenna array P1 and a second antenna array P2 of the antenna array device 200, in addition to one isolation unit group (e.g., isolation unit groups 120*a* and 120*b* in FIG. 4) disposed between adjacent two of antenna elements, other isolation unit group (e.g., other isolation unit groups 130*a* and 130*b* in FIG. 4) can be disposed between the adjacent two of the antenna elements. In other words, the other isolation unit groups are adjacent to the isolation unit group respectively and are disposed between the adjacent two of the antenna elements, where arrangement directions of the other isolation unit groups are parallel to arrangement directions of the isolation unit group respectively.

In some embodiments, a distance (e.g., a distance D1 in a part SP' of the antenna array device 200 in FIG. 5) between the other isolation unit group and the adjacent isolation unit group can be less than an one-twentieth wavelength of the center frequency of the resonance frequency band of the first antenna array P1 and the second antenna array P2.

In some embodiments, respective vias of the two isolation unit groups provided between adjacent two of the antenna elements can resonate with the above-mentioned antenna elements to isolate signals between these antenna elements. In other words, a part of the signals generated by one of the antenna elements can interfere with adjacent antenna elements by positions of the vias of the two isolation unit groups. Therefore, these vias can be used to resonate with the antenna elements to prevent the part of the signals generated by the antenna elements from interfering with the adjacent antenna elements. In this way, isolation (this isolation will be better than a single isolation unit group between adjacent two of the antenna elements) between these antenna elements can be further increased, thereby increasing a steering range of each antenna element.

It is worth noting that the other isolation unit group have the same structure as the isolation unit group, so it will not be repeated here.

Figure 7:
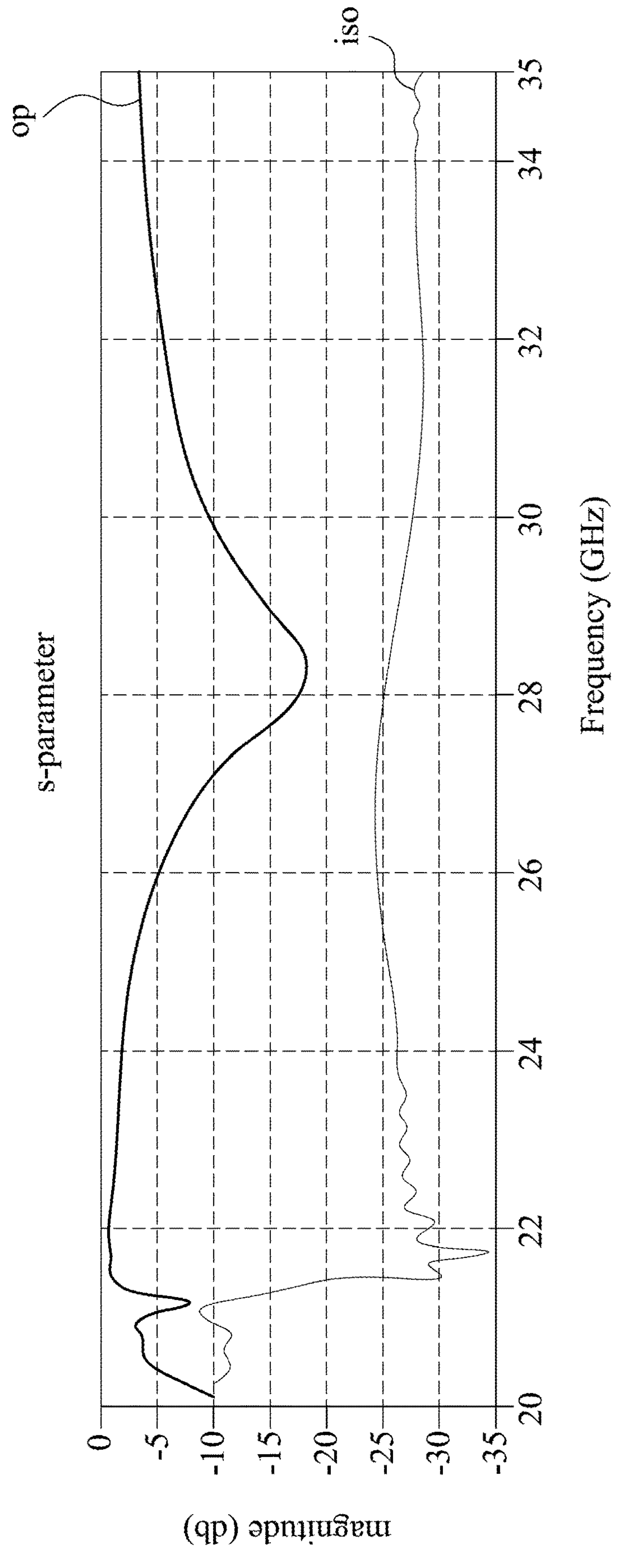
FIG. 7 is a schematic diagram illustrating a resonance frequency band and isolation of the part of the antenna array device according to another embodiment of the disclosure.

FIG. 7 is a schematic diagram illustrating a resonance frequency band and isolation (s-parameter and frequency) of the part SP' of the antenna array device 200 according to another embodiment of the disclosure. Referring to FIGS. 4 to 7 at the same time, a resonance frequency band op of the part of SP' of the antenna array device 200 is about 27.08 GHz to 29.93 GHz (frequency band with return loss less than −10 dB), and its center frequency is about 28 GHz. In this way, isolation iso of the part SP' of the antenna array device 200 is about −25 dB. In other words, the isolation iso of the part SP' of the antenna array device 200 fulfills isolation requirements of the fifth-generation new radio (5G NR) standard (i.e., less than −20 dB).

Based on the above, the above-mentioned antenna array device 200 further increases the isolation between the antenna elements using the two isolation unit groups disposed between the two adjacent antenna elements, thereby greatly increasing a steering angle of each antenna element.

In summary, the antenna array device of the present disclosure greatly increases the isolation of the antenna elements using the above-mentioned arrangement of the isolation units. In this way, when the isolation of each antenna element is greatly increased, the steering angle of the antenna elements can be further increased without causing a coupling effect.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna array device, comprising:

a substrate, comprising a first surface and a second surface;

a plurality of antenna elements, disposed on the first surface, wherein the plurality of antenna elements have a first polarization direction and a second polarization direction opposite to the first polarization direction, and the plurality of antenna elements have a first via respectively;

a metal ground plate, disposed on the second surface; and a first isolation unit group, disposed on the first surface, and disposed between adjacent two of the plurality of antenna elements, wherein an arrangement direction of the first isolation unit group is perpendicular to the first polarization direction and the second polarization direction, wherein the first isolation unit group is two isolation units which are disposed adjacent to each other along a direction perpendicular to the first polarization direction and the second polarization direction, each of the two isolation units comprises an outer end and an inner end opposite to the outer end, and the inner end is connected to the metal ground plate via a second via, wherein each one of the two isolation units is composed of a metal strip, and a length of the metal strip in the direction perpendicular to the first polarization direction and the second polarization direction is a quarter wavelength of center frequency of a resonance frequency band of the plurality of antenna elements, wherein a distance between the two isolation units disposed on the first surface of the substrate is less than one-twentieth wavelength of center frequency of a resonance frequency band of the plurality of antenna elements, and wherein each of the plurality of antenna elements comprises an edge, and a length of a separation distance between the first isolation unit group and one of the antenna elements that is adjacent to the first isolation unit group is one-third of length of the edge of each of the plurality of antenna elements.

2. The antenna array device of claim 1, further comprising a second isolation unit group, the second isolation unit group is adjacent to the first isolation unit group respectively, and is disposed between the adjacent two of the plurality of antenna elements.

3. The antenna array device of claim 2, wherein an arrangement direction of the second isolation unit group is parallel to the arrangement direction of the first isolation unit group, wherein the plurality of antenna elements are connected to antenna feed points via the respective first via.

4. The antenna array device of claim 3, wherein a distance between the first vias of the adjacent two of the plurality of antenna elements is a half wavelength of center frequency of a resonance frequency band of the plurality of antenna elements.

5. The antenna array device of claim 2, wherein the first isolation unit group and the second isolation unit group are arranged between each two antenna elements of the plurality of antenna elements respectively.

6. The antenna array device of claim 1, wherein the first polarization direction and the second polarization direction both are horizontal polarization directions, or both are vertical polarization directions.

* * * * *